Patented Dec. 28, 1937

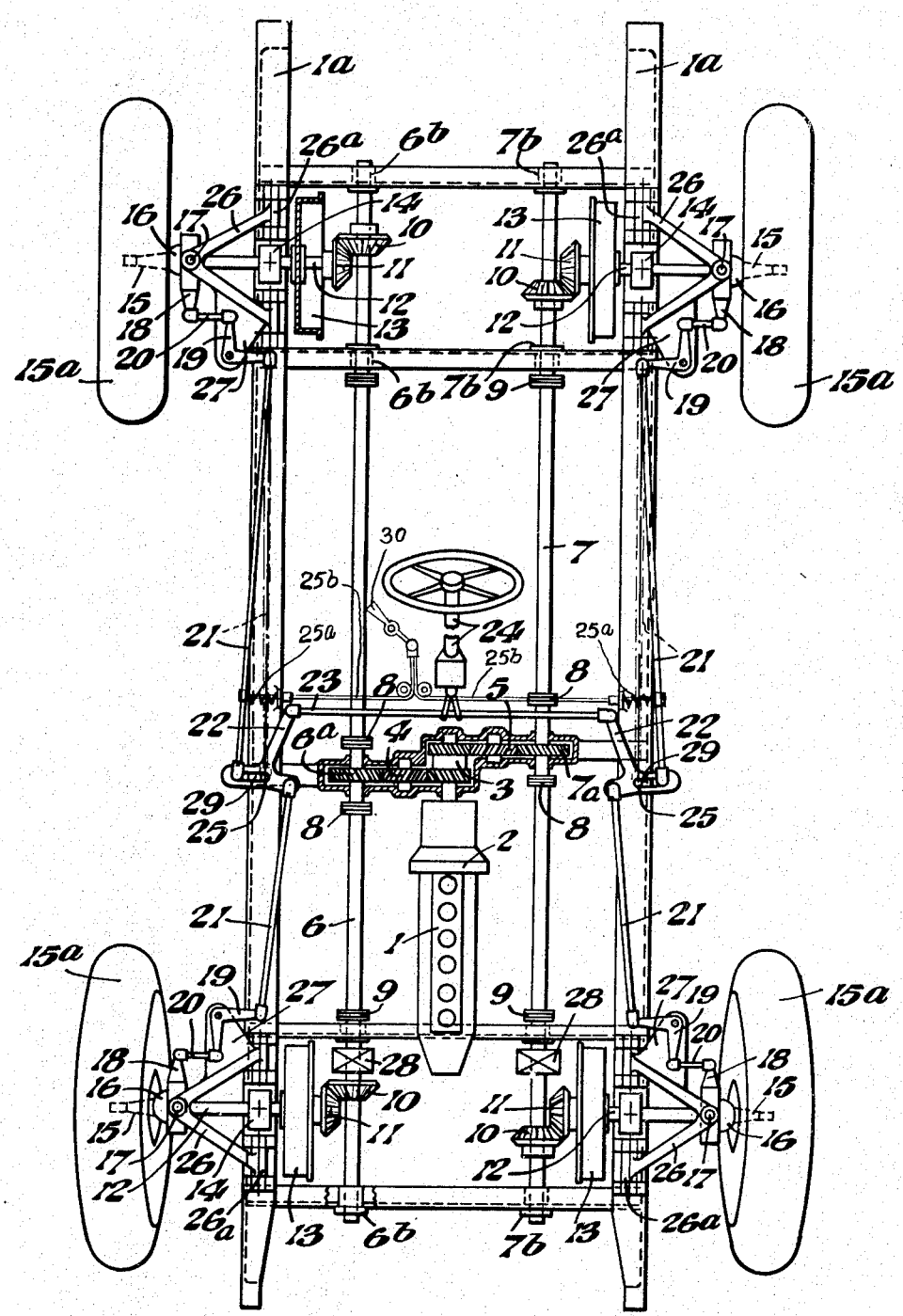

2,103,624

UNITED STATES PATENT OFFICE 2,103,624

MOTOR ROAD VEHICLE

Hugh Lewis Pingo Lester, Greens Norton, Towcester, England

Application May 25, 1936, Serial No. 81,743
In Great Britain April 16, 1936

4 Claims. (Cl. 180—50)

This invention relates to improvements in motor road vehicles and more particularly to the arrangement of transmission and steering mechanism.

The object of the invention is to provide an arrangement in which all road wheels are driven and steerable, the resultant vehicle being easy to handle, quick and sensitive in steering and possessing good road holding and acceleration powers without tendency to skid.

A further object is to provide an arrangement which although possessing the above advantages will still be reasonably cheap to produce and although primarily intended for use with racing or fast sports cars may be readily adapted for use on ordinary cars and commercial vehicles. Still further, the present invention contemplates the provision of means whereby with a vehicle with four steering road wheels, a pair thereof can be brought into and out of the dirigible condition, so that when driving the vehicle in busy thoroughfares and towns normal front wheel steering can be adopted.

According to this invention a multi-driving wheel transmission system for motor road vehicles in which road wheels front and rear of the vehicle are driving wheels is provided, and the invention consists in the provision of driving shafts extending longitudinally along and carried by the vehicle frame so as to have no movement of translation relatively thereto, a pair of live axles at front and a pair at rear of the vehicle rotating in bearings fixed to the vehicle frame, gearing at the inner ends of said axles connecting them to the front and rear ends of said shafts, brake drums on the inner ends of said live axles, universal joints in said live axles whereby the outer ends of said axles can rock relatively to the vehicle frame and the inner ends of the live axles carrying the brake drums, stub axles on the outer ends of said live axles and free wheel devices at the front ends of said longitudinal shafts.

The arrangement allows the brake operating mechanism to be located upon the chassis of the vehicle thereby reducing unsprung weight and facilitating the use of a simple and positive brake compensating gear and in the use of a hydraulic brake system the arrangement permits the use of rigid pipes throughout. It is preferred to incorporate free wheel devices in the transmission to the front steering wheels to enable them to idle when decelerating, e. g. when negotiating steep corners, as by such means the risk of skidding is materially reduced.

Any suitable independent wheel suspension may be employed such as coil springs, torsion bar or like mechanism.

In carrying an embodiment of the invention into practice an engine disposed substantially centrally of the vehicle drives a pair of longitudinally disposed shafts arranged one on each side of the vehicle and coupling the front and rear road wheels.

The power is transmitted to the shafts through a suitable change speed gear box and a differential gear, common to both shafts, the forward portions of each of the shafts having incorporated therein free-wheel devices. The differential gear may have means incorporated therewith to enable it to be locked for instance when traversing loose ground or when the vehicle is being run over a straight course as on a speed record attempt. Drive is transmitted to the road wheels by means of short shafts mounted in bearings transversely of the vehicle, bevel, worm or other suitable gearing being employed for the purpose, the outer ends of said transverse shafts having universally jointed hub shafts upon them by means of which the wheels are deflected for steering purposes. The transverse shafts also carry the brake drums provided for each wheel.

The longitudinal shafts may be provided with universal joints at their ends to compensate for any misalignment and any suitable form of synchromesh clutch may be provided between the power unit and the differential gear the pinion wheels of which are internally bevel toothed and externally skew or helically toothed to engage the driving gears on the two shafts.

In order that this invention may be clearly understood a drawing is appended hereto, somewhat diagrammatically illustrating in part sectional plan an embodiment thereof.

Referring to the drawing the power unit 1 is preferably arranged along the centre of the vehicle frame 1a, and for a racing motor vehicle or other suitable vehicle the power unit is preferably arranged well within the vehicle frame. The power unit has a clutch 2 and differential gear 3 connecting it to gear wheels 4 and 5 operating either side of the axis of the vehicle for transmitting rotation to a pair of longitudinal driving shafts 6 and 7 supported in suitable bearings 6b and 7b carried by longitudinal frame members of the vehicle. These shafts carry gear wheels 6a and 7a with which mesh the beforementioned gear wheels 4 and 5, and such shafts preferably incorporate flexible couplings at suitable parts, and preferably opposite sides of and close to the said gear wheels as at 8 and also near their ends as at 9. The ends of the shafts are provided with bevel gear wheels 10 meshing with corresponding gear wheels 11 carried by transverse axles 12, two pairs of such axles being provided, each axle carrying a brake drum 13 and embodying a universal joint 14 between the brake drum and its free end, to which free ends are adapted the road wheels 15a. The road wheels 15a are fitted on stub axles 15 in axial alignment with the beforementioned axles 12 and pivotally connected thereto by universal joints 16. These universal joints are accommodated in steering heads 17 which have arms 18 projecting therefrom and connected to bell crank levers 19 through the medium of suitable links 20, the bell crank levers being connected to steering arms or rods 21 extending inwardly and longitudinally relatively to the vehicle body. The inner ends of these arms or rods 21 are connected to a pair of levers operated from the steering wheel, a suitable arrangement consisting in providing two substantially T-shaped levers 22 to the ends of the transverse limbs of which are connected the inner ends of the two longitudinal arms or rods 21. The free ends of the central limbs of these T shaped levers are connected to a cross rod 23 adapted to be actuated by a steering wheel column 24 and appropriate mechanism, so that the T-shaped levers are rocked about pivots 25 located at the junction of their centre limbs and transverse limbs.

By this arrangement all four wheels are simultaneously steerable so that when steering in one direction the wheels on one side of the vehicle adapt themselves to the arc of travel of such side of the vehicle and those on the other side adapt themselves to the outer arc of travel, or in other words the two front wheels would be inclined in substantially the same direction and the two rear wheels in the reverse direction of inclination, appropriate compensation being made for the difference in the two arcs. This compensation is automatically effected by reason of the arrangement of the said T-shaped levers 22 e. g. by inclining the centre limbs of the T-shaped levers towards each other at their free ends where they are coupled to the said cross rod 23, it being understood that these levers are located in a common horizontal plane.

Suitable free wheel mechanism 28 is preferably provided at the front ends of the longitudinal shafts 6 and 7 to enable the front wheels to be idle momentarily during deceleration.

The shock absorbing means may take the form of semi-elliptical, half-elliptical coiled or other suitable springs, and the junction of the stub axles to the said driving axles, i. e. the said steering heads 17, are attached to suitable brackets, e. g. V-shaped brackets 26 pivoted at the ends 26a of their limbs to the vehicle frame on axes coinciding with the universal joints 14 of the driving axles, the apices of such brackets being connected to the junction of the stub axles. These V-shaped members can carry inwardly unilateral lugs or brackets 27 on which are pivotally supported the beforementioned bell crank levers 19 of the steering transmission mechanism.

By means of the foregoing arrangement the driving shafts 6 and 7 are not affected by the movements of translation of the axles relatively to the vehicle frame due to shock absorbing movements, and all braking stresses and strains are taken up by the vehicle frame thereby relieving the stub axles and associated parts from a large amount of shock and strains arising out of braking.

It is desirable to be able to readily adapt the four road wheels to the requirements of normal front wheel steering, and therefore suitable means may be provided to readily effect this change from four steering wheels to two steering wheels. This can be effected by connecting the front ends of the longitudinal rods or arms 21 connected to the rear wheel bell crank levers 19, by pin and slot connections to the appropriate parts of the said T-shaped levers. For this purpose each T-shaped lever 22 has a slot 29 extending from its pivot 25 to the point of attachment of the appropriate rear longitudinal rod or arm 21, the latter having a pin slidable in such slot, e. g. against the influence of a spring 25a normally holding the rod or arm in the steering transmission position as shown in the drawing. These two rods or arms can be swung inwards against the influence of such springs to the non-steering positions, shown in dot and dash lines, by Bowden wire or other suitable control mechanism operable by the driver of the vehicle. For example two Bowden wires 25b may extend along the cross rod 23 connecting the two T shaped levers, and can be connected to the parts of the said two longitudinal rods or arms 21 at points adjacent to the ends of the cross rod as shown, the other ends of the Bowden wires being connected to a control lever 30, which may be on the steering column 24.

The differential gear 3 may have incorporated with it a device to enable it to be locked to prevent relative speeds of the axles and shafts, e. g. when traversing loose ground or when the vehicle is being run over a straight course as on a speed record attempt.

In steering both offside wheels and both near side wheels run over the same ground respectively thereby providing quick and sensitive steering and the free wheel devices provide a means of automatically disconnecting the front wheels from the drive upon occasions of sudden deceleration such as when turning at speed. The brake drums and operating mechanism being arranged upon the chassis reduces unsprung weight to a minimum enabling the employment of simple compensation gear and in the use of a hydraulic braking system it is possible to use rigid pipes as there are no dirigible parts necessitating flexible conduits.

The power unit may be mounted at the front or rear of the vehicle and any type of independent wheel suspension may be employed.

The arrangement described may be said to be an ideal system for racing or fast sports cars although it may be adopted with satisfactory results on ordinary cars and commercial vehicles.

I claim:—

1. In a motor road vehicle, a main frame, two pairs of driven road wheels, four live axles carrying said wheels, longitudinal shafts carried by said frame, gear wheels on the ends of said shafts meshing with gear wheels on said axles, joints in said axles dividing each of them into two parts, one being mounted in fixed bearings on the frame and the other providing independent shock absorbing movements of the outer ends of the axles relatively to the vehicle frame and said shafts, stub axles pivoted to the outer ends of said live axles, steering means connected to said stub axles, an engine disposed between said shafts, a differential gear at one end of and driven by said engine, and gearing connecting said differential gear to both of said shafts.

2. In a motor road vehicle transmission mechanism, a power unit, driving shafts extending longitudinally along and carried by the vehicle frame so as to have no movement of translation relatively thereto, means operatively connecting said shafts to the power unit so that they are driven in unison, a pair of live axles at front and a pair at rear of the vehicle rotating in bearings fixed to the vehicle frame, gearing at the inner ends of the said axles connecting them to the front and rear ends of said shafts, brake drums on the inner ends of said live axles, universal joints in said live axles whereby the outer ends of said axles can rock relatively to the vehicle frame and the inner ends of the live axles carrying the brake drums, stub axles on the outer ends of said live axles and free wheel devices at the front ends of said longitudinal shafts.

3. In a four wheel drive motor road vehicle, a main frame, four short transverse live axles, bearings in which rotate said axles fixed to the main frame at front and rear, an engine, longitudinal shafts geared to the engine of the vehicle so that they are driven in unison, fixed bearings on the vehicle frame in which the shafts are mounted, gearing directly connecting the said shafts to the said axles, joints in said axles between the bearings in which they are supported and their outer ends, road wheels on the outer ends of said axles brackets pivoted to the vehicle frame at points approximately coinciding with said joints in the axles, and means connecting the outer ends of said axles to said brackets.

4. In a motor road vehicle, a main frame, two pairs of driven road wheels, four live axles carrying said wheels, fixed bearings on the vehicle frame supporting the said axles, a power unit, a pair of longitudinal shafts carried by said frame, means operatively connecting said shafts to the power unit so that they are both driven in unison, gearing adjacent the ends of said shafts directly connecting them to said axles, joints in said axles permitting independent shock absorbing movements of the outer ends of the axles relatively to their inner ends and the vehicle frame and said shafts, stub axles pivoted to the outer ends of said live axles, and steering means connected to said stub axles for moving them in unison.

HUGH LEWIS PINGO LESTER.